Patented Jan. 13, 1942

2,270,020

UNITED STATES PATENT OFFICE 2,270,020

COVERED WELDING ELECTRODE

William T. Graham, Elm Grove, Wis., assignor to A. O. Smith Corporation, Milwaukee, Wis., a corporation of New York No Drawing. Application November 27, 1939, Serial No. 306,293

8 Claims. (Cl. 219—8)

This invention relates to a covered welding electrode for metallic arc welding and to a method of making such an electrode.

In the manufacture of continuous reeled electrodes for automatic arc welding, it is desirable to employ coverings of substantially the same compositions and qualities as those employed for electrodes for hand arc welding, but in many instances the extruded type of covering gives difficulty when applied to rods which must be bent to some extent. These difficulties are varied. In some instances the surface of the extruded covering has a tendency to crack and check, destroying the continuity of the surface and the performance of the covering; in others the covering spalls off either during manufacture or in service.

Heretofore, continuous rods have been covered by materials in which a paper, cord, or fabric constituted the body of the covering, the fabric being impregnated either by a liquid such as sodium silicate or by a paste as by extrusion. In these types of coverings the cellulosic nature of the structure was important in functioning in the arc to provide a deoxidizing gaseous protection for the weld metal. However, for certain purposes, it is desirable to substantially eliminate the organic constituent of the covering and to employ what is known as a mineral type of covering, and in other instances, it is desirable to have the organic constituent distributed in finely divided particles throughout the covering.

The principal object of the present invention is to provide means to protect the ordinary extruded covering on electrodes where the latter are made in continuous reel lengths, without objectionably affecting the action of the covering in welding.

Another object is to provide a continuous welding electrode with a covering which will withstand a reasonable amount of bending before and after baking.

Another object is to provide a continuous welding electrode with an extruded covering and to protect the covering while soft from undue distortion when reeling the electrode before baking.

In accordance with the invention a thin tape of cloth gauze or of Cellophane is tightly wrapped around the electrode, preferably spirally, as the latter emerges from the extrusion nozzle. The width of the tape is ordinarily about one inch although it may be of greater width if desired.

When gauze is employed, it is well to apply a solution of a suitable glue, such as a vegetable glue, by dripping it onto the gauze wrapping. This tends to keep the gauze in place on the electrode and to prevent fraying of the edges of the gauze.

The covering which is extruded upon the rod may be of any suitable composition such as employed for hand welding electrodes and usually is of substantial thickness. For instance, a typical extruded covering on a one-fourth inch electrode will weigh approximately from sixteen to twenty-one grams per foot of electrode, and the metal core of the electrode, if ordinary steel, will weigh about seventy-five and seven tenths grams per foot. The gauze which is applied on the outside of the covering under the present invention weighs approximately forty-three hundredths gram per foot of electrode. Thus the gauze or outer wrapping is only about 2% of the weight of the covering and is preferably provided at less than 5% of the weight of the covering.

Both Cellophane and gauze are basicly cellulosic materials. However, being on the outside of the covering and being thin, the materials are readily consumed on the outside of the arc region and do not materially affect the action of the arc or the functioning of coverings as would be the case with cellulosic materials incorporated in the covering.

It has been found that the wrapping is insufficient in amount to alter the characteristics of the covering for welding purposes, yet, by reason of its tight binding effect it holds the covering in place during production operations and subsequent use. The extruded covering material does not seem to crack or check at the surface either during reeling or drying as would be the case were its surface freely exposed without the wrapping.

Furthermore, it has also been found that covering compositions may be employed with the present invention which would normally be unsatisfactory for commercial production even on straight electrodes, and which may be desirable from the standpoint of giving better results for certain welding conditions. The invention extends the possible range of composition of coverings for commercial production and use.

The invention is distinguished from coverings suggested heretofore and employing substantially heavy tape or woven materials which constituted the principal body of the covering. It preserves all of the advantages in production and use of the extruded type of covering in which the materials are intimately mixed and compacted upon the rod.

Extruded coverings vary in the time required for drying or baking, and in some instances nearly an hour is required. In order to obtain any economical rate of production it is impossible to have a continuous electrode passing from the extrusion nozzle in a straight line through an oven. Consequently, in the manufacture of a continuous rod with an extruded covering, the rod is wound on a reel and placed in the oven or is wound on a continuously revolving drum in an oven and from which it emerges progressively. In either case, the present invention, by reason of the wrapping holds the extruded covering concentric to the rod, preventing it from squashing out while soft, and preserves the surface of the covering as the rod is bent on the reel or drum. The gauze has an advantage over the use of Cellophane since, being porous it more readily allows the escape of moisture from the covering during baking.

Various embodiments may be employed within the spirit of the invention as expressed in the accompanying claims.

1. A coil of welding electrode disposed on a reel for progressive unwinding during continuous arc welding operations and comprising a metal rod having a substantially concentric baked covering thereon of the extruded compact type, and means on the outside of said covering to substantially preserve its concentricity during reeling and for preventing spalling of the covering during subsequent unreeling.

2. A coil of welding electrode disposed on a reel for progressive unwinding during continuous arc welding operations and comprising a metal rod having a substantially concentric baked covering thereon of the extruded compact type, and a very thin wrapping on the outside of said covering to substantially preserve its concentricity during reeling before baking and for preventing spalling of the covering during subsequent unreeling.

3. An electrode for continuous electric arc welding operations comprising a rod of metal, an extruded covering thereon of materials which tend to check or surface crack after extrusion and during subsequent handling, and a thin, tight wrapping of Cellophane on the outside of the covering serving to counteract such tendency, and to protect the covering during reeling and handling without materially altering its characteristics in welding.

4. A coil of welding electrode disposed on a reel for progressive unwinding during continuous arc welding operations and comprising a metal rod having a substantially concentric baked covering thereon of the extruded compact type, and a very thin wrapping of porous gauze on the outside of said covering to substantially preserve its concentricity during reeling before baking and for preventing spalling of the covering during subsequent unreeling.

5. The method of protecting an extruded covering on a metallic arc welding electrode from checking and cracking during handling subsequent to the extrusion operation which comprises applying a very thin, tight wrapping of strong porous material preferably in tape form to the outer surface of the covering immediately after the extrusion thereof, progressively winding the electrode on a reel, and subsequently baking the electrode to decrease its moisture content, said wrapping allowing the escape of moisture during baking and providing support for the surface of the covering to prevent its checking during reeling, baking and subsequent handling, without materially altering the characteristics of the covering in welding.

6. The method of manufacturing electrodes for arc welding which comprises extruding a covering of substantial thickness upon a metal rod of continuous length, applying a thin, tight, spiral wrapping of tape on the outside of the covering as it emerges from the extrusion nozzle, winding the rod and its covering on a reel or drum, and subsequently baking the electrode, said wrapping being porous to allow the escape of moisture during baking and providing support for the surface of the covering to prevent its checking and cracking during reeling, baking and subsequent handling.

7. A coil of welding electrode disposed on a reel for progressive unwinding during continuous arc welding operations and comprising a metal rod having a substantially concentric baked covering thereon of the extruded compact type, and a very thin wrapping of Cellophane on the outside of said covering to substantially preserve its concentricity during reeling before baking and for preventing spalling of the covering during subsequent unreeling.

8. The method of manufacturing covered electrodes of the reeled type for automatic arc welding operations, comprising extruding a covering having characteristics for improving the weld, tightly wrapping the covering with a thin porous strip of combustible material insufficient in amount to materially alter the characteristics of the extruded covering, reeling the electrode and its covering, transferring the reel to an oven, and baking the covering to expel moisture therefrom.

WILLIAM T. GRAHAM.